US008108534B2

(12) United States Patent
Carroll et al.

(10) Patent No.: US 8,108,534 B2
(45) Date of Patent: Jan. 31, 2012

(54) DATA INTEGRATION SYSTEM WITH PROGRAMMATIC SOURCE AND TARGET INTERFACES

(75) Inventors: Andrew J. Carroll, Arlington, MA (US); Jeremy D. Rishel, Boston, MA (US)

(73) Assignee: JDA Software Group, Inc., Scottsdale, AZ (US)

( * ) Notice: Subject to any disclaimer, the term of this patent is extended or adjusted under 35 U.S.C. 154(b) by 1201 days.

(21) Appl. No.: 10/611,779

(22) Filed: Jun. 30, 2003

(65) Prior Publication Data

US 2004/0225671 A1 Nov. 11, 2004

Related U.S. Application Data

(60) Provisional application No. 60/469,259, filed on May 8, 2003.

(51) Int. Cl.
*G06F 15/16* (2006.01)
(52) U.S. Cl. .......................... 709/230; 709/204; 709/219
(58) Field of Classification Search .................. 709/204, 709/230, 219
See application file for complete search history.

(56) References Cited

U.S. PATENT DOCUMENTS

| | | | | |
|---|---|---|---|---|
| 6,308,178 B1 * | 10/2001 | Chang et al. | ................... | 707/100 |
| 6,334,158 B1 * | 12/2001 | Jennyc et al. | ................... | 719/328 |
| 6,381,709 B1 * | 4/2002 | Casagrande et al. | ............ | 714/18 |
| 6,615,204 B1 * | 9/2003 | Menon | ................... | 1/1 |
| 6,996,589 B1 * | 2/2006 | Jayaram et al. | ................ | 707/204 |
| 7,149,746 B2 * | 12/2006 | Fagin et al. | ................... | 707/100 |
| 7,844,904 B2 * | 11/2010 | Patitucci | ........................ | 715/735 |

(Continued)

FOREIGN PATENT DOCUMENTS

| | | |
|---|---|---|
| TW | 511009 | 11/2002 |
| TW | 513650 | 12/2002 |
| TW | 200511039 | 3/2005 |

OTHER PUBLICATIONS

Andrew J. Carroll, et al., "Data Integration System with Programmatic Source and Target Interfaces" patent application, U.S. Appl. No. 10/611,560, filed Jun. 30, 2003.
Andrew J. Carroll, et al., "Data Integration System with Programmatic Source and Target Interfaces" patent application, U.S. Appl. No. 10/611,276, filed Jun. 30, 2003.

*Primary Examiner* — Philip Lee
(74) *Attorney, Agent, or Firm* — Booth Udall, PLC; Steven J. Laureanti

(57) ABSTRACT

In one embodiment, a system is provided for executing bulk data transfers between persistent data stores in connection with an enterprise-level business workflow. A data integration server is coupled to one or more stores. Programmatic source interfaces are each associated with a source store, defined according to a source interface specification, and exposed within the server during a transfer in connection with an enterprise-level business workflow to enable the server to extract from its source store data entities for loading into any selected target stores during the transfer. Programmatic target interfaces are each associated with a target store, defined according to a target interface specification, and exposed within the server during a transfer in connection with an enterprise-level business workflow to enable the server to load into its target store data entities extracted from any selected source stores during the transfer. Each programmatic interface: (1) provides to its store an abstraction of transfer operations within the server such that custom code need not be developed in connection with its store to enable transfers between its store and any other particular stores; and (2) isolates from the server specific details associated with its store such that custom code need not be developed in connection with the server to enable transfers between its store and any other particular data stores.

52 Claims, 2 Drawing Sheets

U.S. PATENT DOCUMENTS

| | | | |
|---|---|---|---|
| 2001/0008023 A1* | 7/2001 | Bond et al. | 717/8 |
| 2002/0046301 A1* | 4/2002 | Shannon et al. | 709/328 |
| 2002/0174032 A1 | 11/2002 | Chien | |
| 2003/0233249 A1* | 12/2003 | Walsh et al. | 705/1 |
| 2004/0006549 A1* | 1/2004 | Mullins et al. | 707/1 |
| 2005/0223392 A1* | 10/2005 | Cox et al. | 719/328 |
| 2010/0223049 A1* | 9/2010 | Menezes et al. | 704/5 |

* cited by examiner

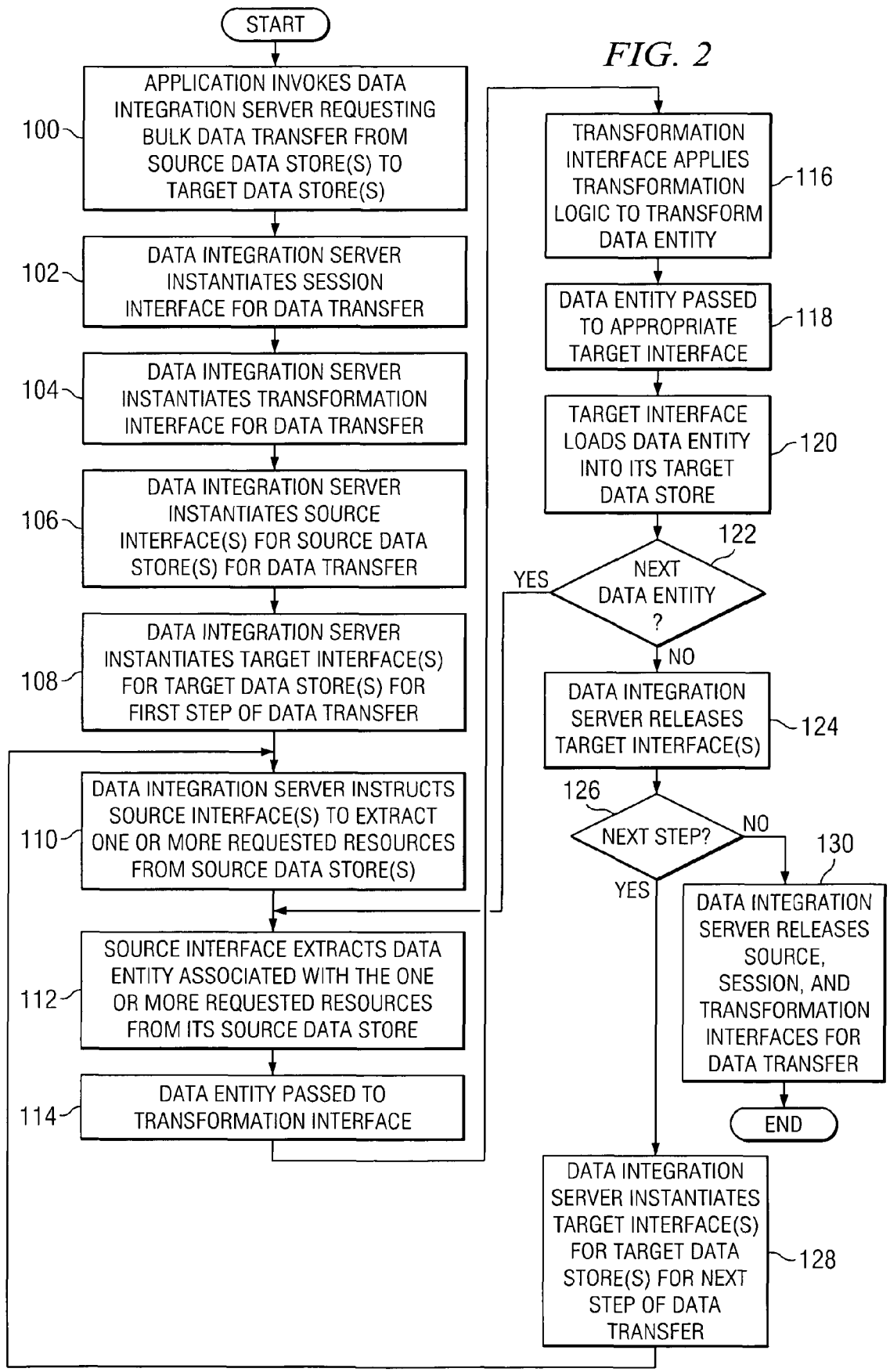

DATA INTEGRATION SYSTEM WITH PROGRAMMATIC SOURCE AND TARGET INTERFACES

RELATED APPLICATION

This application claims the benefit under 35, U.S.C. §119(e) of U.S. Provisional Application Ser. No. 60/469,259, filed May 8, 2003.

TECHNICAL FIELD OF THE INVENTION

This invention relates in general to data integration, and more particularly to a data integration system with programmatic source and target interfaces.

BACKGROUND OF THE INVENTION

In many business environments, it may be necessary to execute bulk data transfers between a variety of persistent data stores associated with applications or other systems both internal and external to an enterprise. With previous techniques, to handle such bulk data movement from a source data store to a target data store in connection with operation of an application in a business workflow, in addition to developing the code for the application itself an application developer was typically required to: (1) custom develop a first piece of code, specific to the application and the source data store, for extracting data from the source data store and placing the extracted data in an intermediate storage location (such as a flat file for example) in an intermediate format; (2) custom develop a second piece of code (such as a Perl script for example), specific to the application and the intermediate format, for transforming the stored data into a format suitable for the target data store; and (3) custom develop a third piece of code, specific to the application and the target data store, for loading the transformed data into the target data store. Such custom-developed code is seldom reusable, is typically difficult to maintain, and typically makes application integration difficult as additional applications and data stores are added into the integration environment. Available Extract-Transform Load (ETL) tools can handle extraction of data from particular source data stores, aggregation or other straightforward transformations of extracted data, and loading of transformed data into particular target data stores. Although such ETL tools may be adequate for certain simple integration scenarios involving linking an existing application or other system to a database, such tools are limited in their capabilities and do not relieve an application developer from the burdens discussed above in designing and developing a new application. Accordingly, supporting bulk data integration between persistent data stores remains a pressing need.

SUMMARY OF THE INVENTION

According to the present invention, disadvantages and problems associated with previous data integration techniques may be reduced or eliminated.

In one embodiment, a system is provided for executing bulk data transfers between persistent data stores in connection with an enterprise-level business workflow. A data integration server is coupled to one or more persistent data stores. One or more programmatic source interfaces are each associated with a corresponding source data store, defined according to a common programmatic source interface specification, and exposed within the data integration server during a bulk data transfer in connection with an enterprise-level business workflow to enable the data integration server to extract from the corresponding source data store one or more data entities for loading into any one or more selected target data stores during the bulk data transfer. One or more programmatic target interfaces are each associated with a corresponding target data store, defined according to a common programmatic target interface specification, and exposed within the data integration server during a bulk data transfer in connection with an enterprise-level business workflow to enable the data integration server to load into the corresponding target data store one or more data entities extracted from any one or more selected source data stores during the bulk data transfer. Each programmatic interface provides to the corresponding data store an abstraction of bulk data transfer operations within the data integration server such that custom code need not be developed in connection with the corresponding data store to enable bulk data transfers between the corresponding data store and any other particular data stores. Each programmatic interface also isolates from the data integration server specific details associated with the corresponding data store such that custom code need not be developed in connection with the data integration server to enable bulk data transfers between the corresponding data store and any other particular data stores.

Certain embodiments may provide all, some, or none of the advantages set forth in the figures, descriptions, and claims included herein. Certain embodiments may provide one or more other advantages, one or more of which may be readily apparent to those skilled in the art from the figures, descriptions, and claims included herein.

BRIEF DESCRIPTION OF THE DRAWINGS

To provide a more complete understanding of the present invention and the features and the advantages thereof, reference is made to the following description taken in conjunction with the accompanying drawings, in which:

FIG. 2 illustrates an example method of data integration using a data integration system with programmatic source and target interfaces.

DESCRIPTION OF EXAMPLE EMBODIMENTS

Figure 1:
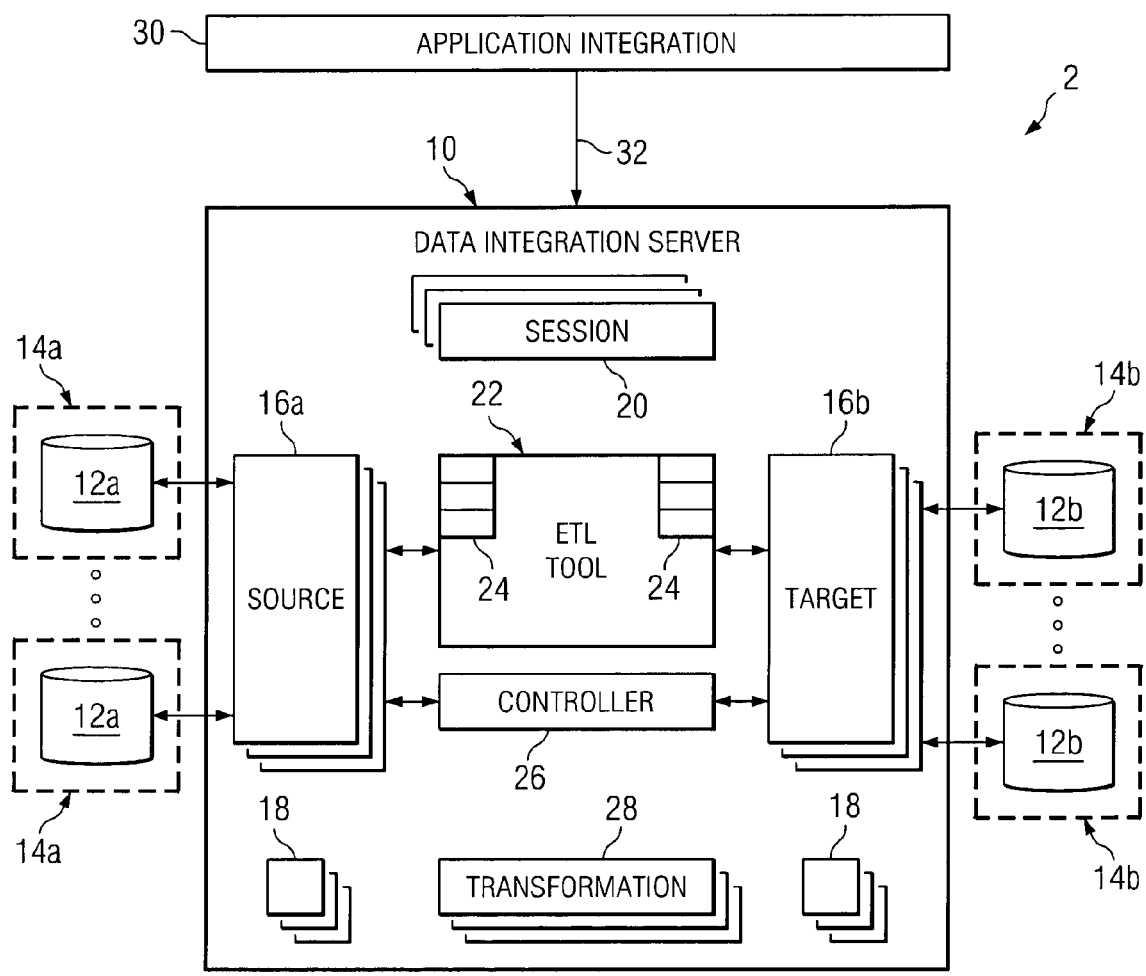
FIG. 1 illustrates an example data integration system with programmatic source and target interfaces.

FIG. 1 illustrates an example data integration system 2 that incorporates programmatic source and target interfaces. System 2 includes a data integration server 10, which may be referred to as a "back bus" server in certain embodiments, that supports bulk data integration between one or more internal persistent data stores 12a associated with internal applications or other systems 14a and one or more external persistent data stores 12b associated with external applications or other systems 14b. For example, in one embodiment, an internal data store 12a may be, associated with a business configuration management system and may provide a master repository for core enterprise reference data relating to the items, locations, vendors, customers, or other entities of an enterprise, whereas an external data store 12b may be associated with a planning, execution, monitoring, or other enterprise application that relies on the reference data in its operations. High performance bulk data transfers typically require interfaces and other integration components designed for these operations.

Data integration server 10 may include one or more JAVA processes or other appropriate software components. In general, data integration server 10 provides a mechanism for bulk data transfers between data stores 12. In one embodiment, data integration server 10 accomplishes extraction of data from a desired source data store 12 (e.g., row by row or object by object), intermediate transformation of the extracted data according to transformation logic if appropriate (e.g., row by row or object by object into and out of the transformation), and loading of the transformed data into a desired target data store 12 (e.g., row by row or object by object). Although loading of data into a target data store 12 is primarily described, data integration server 10 may accomplish insertion, updating, or deletion of data associated with a target data store 12 according to particular needs, and the term "loading" may encompass all such operations where appropriate given the context. Any of these operations may occur, for example, in connection with operation of an application or other system 14 within an enterprise-level business workflow.

In one embodiment, data integration server 10 may accommodate any source data stores 12 and any target data stores 12 using programmatic source and target interfaces 16a and 16b, respectively. Programmatic interfaces 16 may be designed as JAVA or any other appropriate interfaces. In general, source interfaces 16a provide access to retrieve data from an associated source data store 12, and target interfaces 16b provide access to insert, update, or delete data in an associated target data store 12. Where programmatic interfaces 16 are JAVA interfaces, programmatic interfaces 16 may implement a JAVA Application Program Interface (API) to provide such access.

A source interface 16a may persist for any suitable time, for example, for a portion of a single data transfer, for the entire life of only a single transfer, or across multiple data transfers. However, in one embodiment, a source interface 16a persists only for the life of a single data transfer, after which source interface 16a is released or otherwise discarded. Similarly, a target interface 16b may persist for any suitable time, for example, for a portion of a single data transfer, for the entire life of only a single transfer, or across multiple data transfers. However, in one embodiment, a target interface 16b persists only for a single step of a data transfer, after which target interface 16b is released or otherwise discarded.

Although any internal data store 12a may be a source data store or a target data store depending on the bulk data transfer scenario, and similarly any external data store 12b may be a source data store or a target data store depending on the bulk data transfer scenario, for purposes of convenience internal data stores 12a may be referred to as source data stores and external data stores 12b may be referred to as target data stores in certain examples described herein. Thus, in the particular example illustrated in FIG. 1, source interfaces 16a are shown as being associated with internal data stores 12a (i.e. the source data stores in the example) while target interfaces 16b are shown as being associated with external data stores 12b (i.e. the target data stores in the example). However, it should be clearly understood that a source data store 12 may be either internal or external, a target data store 12 may be either internal or external, and data integration server 10 may use programmatic interfaces 16 to accomplish internal-internal, internal-external, external-internal, or external-external bulk data transfers according to particular needs.

In one embodiment, programmatic interfaces 16 provide abstractions of the actual operations performed within data integration server 10 for bulk data transfer between data stores 12 and encapsulate application-specific or other system-specific details. As a result, for example, a developer of an application 14 with an associated data store 12 need not have any knowledge of particular bulk data transfer operations within data integration server 10 or develop code to handle such bulk data transfer operations. Nor does the developer of application 14 need to have knowledge of the details or even the identities of other applications 14 or the associated data stores 12 that may ultimately serve as target data stores 12 (where a source interface 16a is implemented) or source data stores 12 (where a target interface 16b is implemented). Instead, the developer of application 14 may specify, define, or otherwise implement a source interface 16a for extraction of data from associated data store 12, a target interface 16b for loading of data into associated data store 12, or both, depending on how application 14 will be used. Implementing a programmatic interface 16 may include developing code according to an appropriate interface specification to ensure that programmatic interface 16 is fully compatible with other components associated with data integration server 10. After implementation of programmatic interface 16, other applications 14 may, through data integration server 10, use programmatic interface 16 to extract data from (where a source interface 16a is implemented) or load data into (where a target interface 16b if implemented) data store 12 associated with the application 14 that exposes programmatic interface 16. Thus, in contrast to previous techniques, the application developer is spared from developing separate custom code for handling bulk data transfers for each other application 14 to which data may be exported or from which data may be imported. In infrastructures in which even several applications 14 must exchange data, such custom code generation can be a significant burden on development resources.

In one embodiment, data integration server 10 may expose a programmatic interface 16 using a standard File Transfer Protocol (FTP) interface. Typically, an FTP server has access to files persisted on a disk, and applications download or upload these files using the FTP server in accordance with FTP. Where data integration server 10 implements FTP in connection with a programmatic interface 16, however, no files are actually persisted on a disk. Instead, when an FTP client needs to extract data from a source data store 12, the FTP client may open an FTP connection informing data integration server 10 that it is downloading a stream of data from source data store 12. In response, data integration server 10 may simply instantiate the appropriate source interface 16a for source data store 12 and, as source interface 16a produces the stream of data extracted from source data store 12, send the outgoing data stream to the FTP client in accordance with FTP (for example, as a .txt or .xml file depending on the request). Similarly, when an FTP client needs to load data into a target data store 12, the FTP client may open an FTP connection informing data integration server 10 that it is uploading a stream of data to target data store 12. In response, data integration server 10 may simply instantiate the appropriate target interface 16a for target data store 12 and, as the stream of data arrives from the FTP client (for example, as a .txt or .xml file depending on the request), send the incoming data stream to target interface 16a for loading into target data store 12. Since no file is actually read from or written to, there may be little or no latency.

As a result, in one embodiment, data integration server 10 may allow any suitable FTP client to perform bulk data transfers with respect to data stores 12 using programmatic interfaces 16, whether or not these data stores 12 or their associated applications 14 themselves support FTP transfers. From the perspective of the FTP client, data is downloaded or uploaded as in a standard FTP transfer. From the perspective of the data store 12 and its associated application 14, data is exported or imported using the exposed programmatic interface 16 without regard to whether the target (for exporting data using a source interface 16*a*) or the source (for importing data using a target interface 16*a*) is executing an FTP transfer. As described above, programmatic interfaces 16 may isolate data stores 12 and associated applications 14 from such details to provide transparent compatibility between sources and targets. Furthermore, although FTP is described by way of example for a situation in which data is exposed to the client as a file, the present invention contemplates similar operation and benefits in connection with Hypertext Transport Protocol (HTTP) (where data is exposed to the client as a web page), Open Database Connectivity (ODBC) or JAVA Database Connectivity (JDBC) (where the client acts as if it is a database), or any other suitable standard protocol. Thus, broadly, data integration server 10 with programmatic interfaces 16 may provide the ability to transparently add support for standard protocols to existing applications 14 and associated data stores 12 that do not otherwise support such protocols.

In one embodiment, in addition to programmatic interfaces 16, data integration server 10 may support relational interfaces 18 as an alternative for exporting and importing data with respect to simple relational data stores 12. For example, if an application 14 is associated with a relational data store 12, it may be desirable for the application developer to implement a relational interface 18 to allow data integration server 10 to read directly from and write directly to relational data store 12 without the additional complexity associated with a source interface 16*a* or target interface 16*b*, respectively. According to particular needs, the application developer decides whether to implement a programmatic interfaces 16 or a relational interface 18 for data export or import with respect to relational data store 12.

The decision regarding whether to provide a programmatic interface 16 or a relational interface 18 depends on particular needs. For example, if relational data store 12 uses flat files for importing data, then the decision between a target interface 16*b* and a relational interface 18 may depend on the amount of processing performed on the flat files before they are stored in relational data store 12. If relatively little processing is needed and performance is critical, then the application developer may choose to implement a relational interface 18 to directly expose relational data store 12. However, if relatively significant validation or other processing is needed and performance is not as critical, then the application developer may choose to expose relational data store 12 using a target interface 16*b*.

If application or other system 14 has an existing relational interface to its relational data store 12, then it may be desirable to expose that existing relational interface within data integration server 10 as a relational interface 18. However, this may not always be the best option. For example, if the existing relational interface is simply a set of staging tables that are populated and read, validated, and put into real tables, then it may be desirable to instead implement a programmatic interface 16 to eliminate the staging step. The use of a staging area may eliminate the ability to pipeline the data in data integration server 10, which may offset any performance gains of using a relational interface 18. If processing between the staging area and internal tables of relational data store 12 can be performed on a row-by-row basis, then it may be best to convert the existing relational interface to a programmatic interface 16. However, if processing between the staging area and internal tables of relational data store 12 requires complex queries that act on all data, then it may be best to keep the staging tables and simply expose the existing relational interface as a relational interface 18.

In one embodiment, each programmatic interface 16 and relational interface 18 may include an interface schema file and an interface mapping file, each of which may be an XML or other metadata file. The interface schema file may provide a database-neutral description of the physical schema of the data store 12 associated with interface 16, 18. The interface mapping file may provide logical-to-physical mappings for all data entities used as part of interface 16, 18, may identify any data entities that should be used only for programmatic interfaces 16 rather than for relational interfaces 18, and may indicate whether data entities should be used for export (i.e. as sources), import (i.e. as targets), or both. Although separate interface schema and interface mapping files are primarily described, such information may be maintained using a single file or using any other appropriate representation.

A mapping file associated with an interface 16, 18 preferably describes data entities transferred using interface 16, 18 during a bulk data transfer in a way that allows these data entities to be transferred between data stores 12 having different database schema. For example, the data entities transferred may describe people using a type called Person with three fields firstName, lastName, and birthDate. If the data entities are being transferred to or from a data store 12 containing a table called Person with three fields firstName, lastName, and birthDate, then additional configuration is not required with respect to the interface 16, 18 associated with that data store 12. However, if the data entities are being transferred to or from a data store 12 containing a table called People with three fields fName, lName, and bDate, then the mapping file for the interface 16, 18 associated with that data store 12 may provide a mapping between the logical representation Person(firstName, lastName, birthDate) and the physical data schema People(fName, lName, bDate). Although a mapping file is primarily described, the present invention contemplates any suitable mechanism for logical-to-physical mapping to support bulk data transfers between data stores 12 having different database schema.

Data integration system 10 may expose session interfaces 20 to provide a broader level of control and persistence for certain information, such as connection information, associated with bulk data transfers. In one embodiment, for each bulk data transfer involving one or more programmatic interfaces 16, a session interface 20 may be instantiated at the beginning of the transfer for the one or more programmatic interfaces 16 involved in the data transfer, persisted for the life of the data transfer, and released at the conclusion of the data transfer. However, session interfaces 20 may optionally be configured to persist beyond the life of a single data transfer to span multiple data transfers. For example, a session interfaces 20 may be instantiated at startup of data integration server 10 and may not be released until data integration server 10 is shut down.

Session interfaces 20 may provide a generic mechanism for implementing resources representing the data entities to be transferred and providing configuration information needed for a single bulk data transfer for an associated programmatic interface 16, multiple programmatic interfaces 16, or multiple data transfers. Session interfaces 20 may encapsulate and hide from the associated programmatic interfaces 16 appropriate details associated with export and import of resources within a data transfer, such as state information for the resources, connection information for the source and target data stores 12, and other details. Session interfaces 20 may thus provide a mechanism supporting more elegant and intelligent implementations of programmatic interfaces 16. A session interface 20 is preferably basic enough to permit a wide degree of flexibility and customization. In one embodiment, one or more source interfaces 16*a*, one or more target interfaces 16*b*, or both one or more source interfaces 16*a* and one or more target interfaces 16b may be defined within a session interface 20 such that session interface 20 will be instantiated at the start of any data transfer involving one or more of the defined programmatic interfaces 16. Any programmatic interface 16 defined within session interface 20 has access to session interface 20 through an appropriate JAVA function call or otherwise.

Data integration server 10 may support a third party ETL tool 22, which is preferably encapsulated such that internal interfaces and other internal details of ETL tool 22 are not exposed to data integration server 10 during execution. Although the design of data integration server 10 may support any suitable ETL tool 22, in one embodiment INFORMATICA POWERCENTER may be selected for ETL tool 22. INFORMATICA POWERCENTER client tools may be used to design certain bulk data transfers, including certain intermediate transformations that may be required in connection with the data transfers. An INFORMATICA POWERCENTER server may execute these data transfers subject to the direction of data integration server 10, as described more fully below.

ETL tool 22 may provide the ability to connect directly to certain applications or other systems 14 which permit direct reading or writing against associated data stores 12. As an alternative, ETL tool 22 may incorporate ETL adapters 24 that can be used to facilitate such direct connection to certain data stores 12. For example, INFORMATICA POWERCENTER may provide POWERCONNECT adapters 24 to facilitate direct connection to SAP-specific, ORACLE-specific, or other commercial "off the shelf" data stores 12.

As another more flexible alternative, according to the present invention, certain applications or other systems 14 may expose programmatic interfaces 16 that are deployed within data integration server 10. In this case, rather than connect directly with or without adapters 24, ETL tool 22 may extract or load data using the exposed source or target interfaces 16, respectively. For example, INFORMATICA POWERCENTER can be used according to one embodiment of the present invention as an ETL tool 22 to connect to data stores 12 through associated programmatic interfaces 16. ETL tool 22 may act as an FTP client to extract data from or load data into data stores 12 using programmatic interfaces 16 for data stores 12, as described more fully above. For example, where INFORMATICA POWERCENTER is used for ETL tool 22, an INFORMATICA POWERCHANNEL API may allow ETL tool 22 to act as an FTP client to extract or load data using programmatic interfaces 16. Use of programmatic interfaces 16 may allow data integration server 10 to support transparent compatibility between any suitable ETL tool 22 and any suitable data store 12. For example, where INFORMATICA POWERCENTER is used for ETL tool 22, any application 14 having an appropriate programmatic interface 16 within data integration server 10 may support an INFORMATICA POWERCHANNEL API as a result.

Data integration server 10 may support a controller 26 to execute individual bulk data transfers using programmatic interfaces 16 where either ETL tool 22 is not present or its capabilities are not needed. For example, controller 26 may be used to execute data transfers between sources and targets that are closely similar or identical in terms of their resource schemas and no intermediate transformation, validation, or other processing of data is required. For a bulk data transfer involving one or more source interfaces 16a and one or more target interfaces 16b, at the direction of data integration server 10, controller 26 pulls the exported data from the one or more source interfaces 16a and pushes the data to the one or more target interfaces 16b. Controller 26 may pull data from a source data store 12a involved in a data transfer using the associated source interface 16a on a data entity by data entity basis (e.g., row by row or object by object) and push the data to the appropriate target data store 12a for the data transfer using the associated target interface 16b in the same manner. In this particular case, each data entity is extracted from a source data store 12a and loaded into a target data store 12b before the next data entity is extracted and loaded. JAVA or other appropriate code may handle execution of the bulk data transfer. In one embodiment, controller 26 may use a session interface 20 in executing the bulk data transfer subject to the direction of data integration server 10. As described more fully below, in one embodiment controller 26 may use a transformation interface 28, instead of or in addition to a session interface 20, in executing the bulk data transfer subject to the direction of data integration server 10.

In one embodiment, in addition to source interfaces 16a, target interfaces 16b, and any session interfaces 20, data integration server 10 may expose one or more transformation interfaces 28. Although not required, a transformation interface 28 may allow an application developer to design, develop, and package custom or other transformation logic to be applied during a bulk data transfer to resources extracted from source data store 12a using the associated source interface 16a before these resources are loaded into target data store 12b using the associated target interface 16b. If controller 26 extracts and loads data on a data entity by data entity basis as described above and a transformation cannot be performed on that basis (e.g., cannot be performed row by row or object by object), data entity by data entity flow may be accomplished on both sides of the transformation (e.g., row by row or object by object inbound to the transformation, then row by row or object by object outbound from the transformation). A transformation interface 28 may help uncouple transformation logic from programmatic interfaces 16, encapsulating and hiding the transformation logic from programmatic interfaces 16, which may help facilitate more elegant and intelligent implementations of programmatic interfaces 16.

A transformation interface 28 may allow an application developer to design, develop, and package custom or other transformation logic associated with a data transfer between one or more source interfaces 16a and one or more target interfaces 16b without using ETL tool 22. For example, certain transformations may be more difficult or impossible to design using ETL tool 22 or may suffer from performance problems when designed using ETL tool 22. A transformation interface 28 may be useful for developing packaged data integration solutions between commonly used source interfaces 16a and target interfaces 16b, optimized for these programmatic interfaces 16, especially where these programmatic interfaces 16 are associated with data stores 12 containing schematically different resources. For example, some data integration solutions between a planning engine and an operational data store 12 may be designed, developed, and packaged for release to multiple customers, but may require certain transformation logic. A transformation interface 28 may permit this transformation logic to be implemented without impacting programmatic interfaces 16 and without incurring the overhead associated with an enterprise-level or other ETL tool 22.

In one embodiment, one or more source interfaces 16a, one or more target interfaces 16b, or both may be defined within a transformation interface 28 such that the transformation interface 28 will be instantiated at the beginning of any data transfer involving one or more of the programmatic interfaces 16 and such that the associated transformation logic will be applied to the resources being moved in the data transfer. A transformation interface 28 for a data transfer may be instantiated at substantially the same time as any session interface for the data transfer. The present invention contemplates appropriate rules to determine whether transformation logic associated with a transformation interface 28 is applied to the resources in a data transfer, instead of no transformation logic at all or instead of transformation logic available through ETL tool 22.

In one embodiment, data integration server 10 satisfies four main objectives, without limitation: (1) host implementations of programmatic interfaces 16 that are associated with applications or other systems 14; (2) define bulk data movements as atomic data transfers; (3) expose data transfer operations as services to the rest of the system infrastructure; (4) provide connectivity to any ETL tool 22; and (5) execute data transfers non involving an ETL tool 22 using controller 26. The first four of these objectives are described in more detail below. The fifth of these objectives is described in more detail above.

First, data integration server 10 may host implementations of programmatic interfaces 16 that are used to execute bulk data movement between data stores 12. As mentioned above, data entities transferred using a programmatic interface 16 may be referred to as resources. For example, a resource may be a database table or database view, one or more rows within a database table or database view, a flat file, or any other suitable collection of one or more data entities. Resources may be described using appropriate metadata or other information. Data integration server 10 exposes implemented source interfaces 16a to permit export of resources from the associated source data stores 12a and exposes implemented target interfaces 16b to permit the import of resource into associated target data stores 12b. For each programmatic interface 16, data integration server 10 may host configuration information defining the resources available using that programmatic interface 16 (i.e. the data entities available for export or import using programmatic interface 16). Data integration server 10 may be viewed generally as a data entity interface between data stores 12 associated with applications or other systems 14.

In one embodiment, data integration server 10 may allow each programmatic interface 16 to produce and consume data in its particular desired format, such that data integration server 10 converts between formats only as necessary according to the particular programmatic interfaces 16 involved in a data transfer. For example, if source interface 16a produces data in the form of JAVA Document Object Model (JDOM) XML element objects, and target interface 16b consumes data in the form of JDOM XML element objects, then an element object produced from source interface 16a may be passed directly to target interface 16b without conversion. However, if target interface 16b instead consumes data in a different form, such as a JAVA object for example, then data integration server 10 will automatically construct the desired JAVA object from the JDOM element object and pass the JAVA object to target interface 16b. Converting the data being transferred in a data transfer only when necessary according to the particular programmatic interfaces 16 involved in the data transfer may be an important feature. For example, row by row or object by object conversion of large volumes of data may be expensive in terms of performance, such that avoiding such conversion where it is unnecessary may enhance performance.

Second, in one embodiment, data integration server 10 may define bulk data movement of resources as atomic data transfers. In a particular embodiment, data integration server 10 may use an Extensible Markup Language (XML) configuration file to describe the available resources. Bulk data movement of resources may then be defined according to this XML configuration file. A collection of XML, JAVA, or other suitable components within data integration server 10 may describe and model the configuration and state of data integration server 10. Each atomic data transfer, which may involve one or more resources, is preferably defined as a single data transfer.

Third, in one embodiment, data integration server 10 exposes data transfer operations as services to the rest of the system infrastructure. In this case, the system infrastructure incorporates a service-based architecture and data integration server 10 provides bulk data transfer services. Data transfers may be executed by clients and other processes in the overall integration environment in the same manner as any service may be invoked in the overall integration environment, including through use of a suitable infrastructure client interface. A collection of XML, JAVA, or other suitable components may provide the interface implementation and functionality to expose data transfers as services.

Fourth, in one embodiment, data integration server 10 provides connectivity to ETL tool 22 and permits exporting resources to and importing resources from ETL tool 22. In this manner, end-to-end data movements that rely on ETL tool 22 may be designed and executed. In a particular embodiment, data integration server 10 may include five main components that cooperate to provide such ETL tool connectivity: (1) XML and JAVA configuration and modeling for the mapping from resources to ETL tool entities; (2) XML and JAVA code to configure and control execution of ETL processes; (3) JAVA code to handle export of data from a source interface 16a to ETL tool 22; (4) JAVA code to handle import of data from ETL tool 22 and communication of the imported data to a target interface 16b; and (5) JAVA code to implement certain portions of the FTP server protocol for connectivity.

Data integration server 10 may enable application integration at the data tier level. In one embodiment, data integration server 10 may interface to the rest of the system infrastructure, in this example represented as application integration layer 30 (which may be referred to as a "front bus" layer), in the same manner as a traditional application interface. In one embodiment, data integration server is deployed using JAVA Remote Method Invocation (RMI) bindings. Data integration server 10 may expose, as services, operations such as an "executeDataTransfer" operation 32. In this case, applications or other systems 12 associated with data stores 12, or other applications or systems not associated with data stores 12, may simply invoke the "executeDataTransfer" operation 32 to execute data transfers between data stores 12. In one embodiment, data integration server 10 may be installed in association with application integration layer 30 as part of an infrastructure services package targeted at groups associated with an enterprise, such as product development teams, solution and template development teams, implementation teams, and customers.

Example details concerning resources, source interfaces 16a, target interfaces 16b, relational interfaces 18, and session interfaces 20 are described below.

Resources

As described above, the data entities transferred in a bulk data transfer using one or more programmatic interfaces 16 may be referred to as resources. Each data transfer may involve one or more resources, and each resource may include one or more data entities. In one embodiment, resources are defined within the context of a particular programmatic interface 16. For example, one or more resources may be defined for each source interface 16a ("source resources") and one or more resources may be defined for each target interface 16b ("target resources"). If certain data transfers will always export or import a certain group of resources, then that group of resources is preferably defined in a single source interface 16a or target interface 16b, respectively. All data entities within a data store 12 need not necessarily be exposed within data integration server 10 as resources. For example, an order management system may require users to create purchase orders using a transactional interface, such that a target interface 16b is not created for data entities within an associated data store 12 representing orders and thus no target resources are defined for these data entities. However, other data entities within data store representing historical purchase order data may be exposed as source resources for export using a source interface 16a.

In one embodiment, a resource definition for a resource must specify one or more infrastructure services types or other appropriate native types for the resource. Defining a resource may include, without limitation: (1) designing appropriate export and import schema; (2) creating the native type for the resource; and (3) identifying appropriate data integration server configuration information for the resource. Each of these is described in turn below.

Designing the export and import schema for a resource involves identifying the data entities to be exported or imported, respectively, using the source interface 16a or target interface 16b, respectively, for which the resource is defined. In simple cases, the data entities may be individual files, tables, or other self-contained data objects. In complex cases, the data entities may be constructed programmatically from an underlying data store 12. After the data entities to be exported or imported have been identified, these data entities may be defined schematically. The schema may be flat (such as for text files or relational tables) or hierarchical (such as for XML files or complex data objects), depending on the data entity.

Creating the native type for a resource may involve defining native types to represent the schema of each data entity associated with the resource. Each data entity to be exported or imported is associated with a native type. Native types may be reused, such that there may be a one-to-many relationship between native types and data entities and therefore also a one-to-many relationship between native types and resources. When defining native types, base types may be used to restrict or further specify the dimensions of members where possible. For example, base types may be used to identify the maximum length of members. If a data entity may have user-defined fields (UDFs) or other elements on an implementation-specific basis, an appropriate native type definition may depend on whether the data entity is flat or hierarchical. For flat data entities, the native type may not require any member corresponding to UDFs. Instead, programmatic interfaces 16 may place UDFs in a "flex field" or other appropriate location at execution. For hierarchical data entities, the native type may include a member to contain UDFs. Once native type definitions are complete, these native type definitions may be checked in and version controlled. A suitable script may be used during build to generate associated JAVA classes, for example, which may be compiled and packaged with other programmatic interface code. Metadata for native type definitions may also be published as part of a programmatic interface 16.

Data integration server configuration information may need to be identified. Resources may require or permit additional information when defined in the data integration server configuration. The simplest resources may simply refer to the native type exported in a data type attribute. For example:

```
<Resource name="Customer" dataType="Customer"/>
```

If the resource requires no parameters or definition data, resource definition is now complete.

More complex resources may include parameters to allow flexibility in how data entities are exported or imported. An example resource definition that includes two parameters is as follows:

```
<Resource name="Sample" dataType="CISSample">
    <Parameter name="firstParameter" type="xsd:string"/>
    <Parameter name="secondParameter" type="someCIStype"/>
</Resource>
```

Resources may also include definition data that includes a native type that further defines the data entity to be exported or imported. If a resource requires such definition data, the native type required may be specified in a <SourceType> or <TargetType> definition. At this point in resource design, however, a requirement for such definition data should preferably be identified and the supporting native type created. For example, a relational source interface 16a (in this example involving a Structured Query Language (SQL) query) may use the SQLSourceResourceConfig native type to provide definition data:

```
<type name="SQLSourceResourceConfig"
    javaPackage="com.i2.cis.backbus.stdinterfaces.sql.beans">
    <documentation>Defines an SQL query and any parameters
    the SQL query takes.</documentation>
        <member name="sql" type="xsd:string">
    </type>
```

Finally, metadata for additional native types created for resource definition may be packaged with other programmatic interface metadata, and JAVA classes for resource definition native types may be generated, compiled, and included in the appropriate package with other suitable programmatic interface code.

Source Interfaces

Design Overview

In one embodiment, a single data transfer may involve multiple source data stores 12 and a single source interface 16a is implemented for each source data store 12 (i.e. all source resources for the data transfer that are within the same source data store 12 are preferably exposed using the same source interface 16a). Thus, in this embodiment, multiple source interfaces 16a are required if the data transfer involves multiple source data stores 12. The one or more source interfaces 16a for a data transfer are preferably specified as attributes in one or more <Step> elements of the data transfer, where each such step involves export of one or more resources from a data store 12 having an associated source interface 16a. Since in one embodiment a source interface 16a persists for the life of a data transfer (i.e. across all steps of the data transfer), it may be desirable to use configuration information for connection resources or parameters and to define a configuration type for source interface 16a accordingly.

In one embodiment, a source interface 16a will return an iterator to controller 26 for each resource involved in a data transfer using source interface 16a. For each resource, the iterator will return data entities that match the resource definition. For flat files or other flat data objects with UDFs, source interface 16a preferably places additional name/value pairs in "flex fields" or other appropriate locations for the data objects. For hierarchical data objects, UDFs may be explicitly defined. Resource definitions are preferably tailored to the data entities being exported using source interface 16a. If the schema of a resource is known, but the data to populate the resource may vary from data transfer to data transfer, parameters may be used rather than defining different resources. However, for schematically different data entities, it may be necessary to define different resources. Definition data may be used to further extend resource flexibility.

In one embodiment, session interfaces 20 may be used to hold connection resources or states. Source interfaces 16a and target interfaces 16b can share session interfaces 20. Thus, heavyweight resources shared at the session interface level may take advantage of this functionality. As described above, session interfaces 20 may persist between data transfers. Thus, especially if a source interface 16a may only persist for the life a single data transfer, connection resources or states desired to persist between multiple data transfers should preferably be embodied in a session interface 20.

Source Types

In one embodiment, a source interface 16a represents a single instance of an appropriate JAVA source interface API. A source interface 16a may be designed to export all resources from a logical data store, such as a single relational schema or a collection of related flat files for example. A source interface 16a may be defined in the data integration server configuration file by its name and the implementing class. For example:

```
<Source name="MySource" class="com.i2.myProduct.mySource">
```

To permit reuse of common interface mechanisms, appropriate base source interfaces 16a may be defined in the data integration server configuration file on source types. For example:

```
<SourceType name="MySourceType"
  class="com.i2.myProduct.mySource"/>
<Source name="MySource" type="MySourceType">
```

In this case, the source type MySourceType implements the JAVA source interface API, which permits multiple source interfaces 16a to refer to the same source type. Although each of these source interfaces 16a may have different resources and different configuration information, these source interfaces 16a all reuse the base source interface code (i.e. the code in the class corn.i2.myProduct.mySource in this example).

Configuration Types

In one embodiment, source types defined in a <SourceType> element in the data integration server configuration file may designate a configuration type. This configuration type may be a native type that includes any pertinent configuration information for the source interface 16a, such as database connection information. For example:

```
<SourceType name="SQLSourceType"
  class="corn.i2.cis.backbus.stdinterfaces.sql.SQLSource"
  configurationType="SQLSourceConfig"/>
```

In this example, the configurationType of SQLSource is SQLSourceConfig, a defined native type. Configuration elements in the data integration server configuration file match this type definition. The following is an example use of the SQLSourceConfig configuration type:

```
<Configuration name="default">
    <ConfigurationData source="SQLSource">
        <SQLSourceConfig>
            <jdbcType>oracle_thin</jdbcType>
            <userName>d backbus</userName>
            <password>d backbus</password>
            <connectString>camorc3:1521:camorc3</connectString>
        </SQLSourceConfig>
    </ConfigurationData>
</Configuration>
```

As described above, in one embodiment, a source interface 16a persists only for the life of a single data transfer. When source interface 16a begins the data transfer, an appropriate method is called, which passes to source interface 16a the appropriate configuration object if any. Since in one embodiment source interface 16a persists for the life of the data transfer (i.e. across all steps), this method is called only once. If any configuration is necessary on a per resource basis, it may be desirable to implement a suitable method accordingly. At the conclusion of the data transfer, an appropriate method may be called to release any connection or other resources associated with source interface 16a.

Resource Definition Types

Source types, which may be defined in a <SourceType> element in the data integration server configuration file, may designate a resource definition type, which is a native type used to define resources for source interfaces 16a. For example:

```
<SourceType name="SQLSourceType"
  class="corn.i2.cis.backbus.stdinterfaces.sql.SQLSource"
  configurationType="SQLSourceConfig"
  resourceDefinitionType="SQLSourceResourceConfig"/>
```

This may be a complete <SourceType> element tag for SQL-SourceType. It refers to the defined resource definition type SQLSourceResourceConfig. The following is an example definition for an instance of the SQLSource relational source interface 16a and associated resources using this native type:

```
<Source name="SQLSource" type="SQLSourceType">
    <Resource name="Shipper" dataType="Shipper">
        <DefinitionData>
            <SQLSourceResourceConfig>
                <Sql>select * from Shipper order by
                    ShipperKey</Sql>
            </SQLSourceResourceConfig>
        </DefinitionData>
    </Resource>
</Source>
```

Target Interfaces

Design Overview

In one embodiment, a single data transfer may involve multiple target data stores 12 and a single target interface 16a may be implemented for each target data store 12 (i.e. all target resources for the data transfer that are within the same target data store 12 are preferably exposed using the same target interface 16a). Thus, in this embodiment, multiple target interfaces 16a may be required if the data transfer involves multiple target data stores 12. The one or more target interfaces 16a for a data transfer are preferably specified as attributes in one or more <Step> elements of the data transfer, where each such step involves import of one or more resources to a data store 12 having an associated target interface 16a. Since in one embodiment a target interface 16a persists only for a single step of a data transfer, to configure connection resources or parameters over an entire data transfer is may be desirable to define the target interface 16b within the scope of a session interface type and session interface 20. A configuration type may be defined at the session interface type or target type level for configuration information Target interfaces 16b may expose begin, process, and end methods for each resource. In one embodiment, for each resource, the process method must process data objects matching the resource type definition for the resource. For flat files or other flat data objects with UDFs, target interface 16b may expect any additional name/value pairs to be in "flex fields" or other locations for the data objects. For hierarchical data objects, UDFs may be explicitly defined. Resource definitions are preferably tailored to the data entities imported using target interface 16b. If the schema of a resource is known, but the data to populate the resource may vary from data transfer to data transfer, parameters may be used rather than defining different resources. However, for schematically different data entities, it may be necessary to define different resources. Definition data may be used to further extend resource flexibility.

In one embodiment, session interfaces 20 may be used to hold connection resources or states. Source interfaces 16a and target interfaces 16b can share session interfaces 20. Thus, heavyweight resources shared at the session interface level may take advantage of this functionality. As described above, session interfaces 20 may persist between data transfers. Thus, especially if a target interface 16b may only persist for a single step of a data transfer, connection resources or states desired to persist between multiple data transfers should preferably be embodied in a session interface 20.

Target Types

In one embodiment, a target interface 16b represents a single instance of an appropriate JAVA target interface API. A target interface 16b may be designed to import all resources to a logical data store, such as a single relational schema or a collection of related flat files for example. A source interface 16a may be defined in the data integration server configuration file by its name and the implementing class. For example:

```
<Target name="MyTarget" class="com.i2.myProduct.myTarget">
```

To permit reuse of common interface mechanisms, appropriate base target interfaces 16b may be defined in the data integration server configuration file on target types. For example:

```
<TargetType name="MyTargetType"
    class="com.i2.myProduct.myTarget"/>
<Target name="MyTarget" type="MyTargetType">
```

In this case, the source type MysourceType implements the JAVA target interface API, which permits multiple target interfaces 16b to refer to the same target type. Although each of these target interfaces 16b may have different resources and different configuration information, these target interfaces 16b all reuse the base target interface code (i.e. the code in the class corn.i2.myProduct.myTarget in this example).

Configuration Types

In one embodiment, target types defined in a <TargetType> element in the data integration server configuration file may designate a configuration type. This configuration type may be a native type that includes any pertinent configuration information for the target interface 16b, such as database connection information. For example:

```
<TargetType name="FlatFileTargetType"
    class="corn.i2.cis.backbus.stdinterfaces.flatfile.FlatFileTarget"
    configurationType="FlatFileTargetConfig"/>
```

In this example, the configurationType of FlatFileTarget is FlatFileTargetConfig, which is a defined native type. Configuration elements in the data integration server configuration file match this type definition. The following is an example use of the FlatFileTargetConfig configuration type:

```
<Configuration name="default">
    <ConfigurationData target="FlatFileTarget">
        <FlatFileTargetConfig>
            <configFile>FlatFileConfig.xml</configFile>
            <fileDirectory>data</fileDirectory>
            <fileExtension>.out</fileExtension>
            <fleidDelimiter>;</fieldDelimiter>
            <quoteChar></quoteChar>
            <writeHeadings>true</writeHeadings>
        </FlatFileTargetConfig>
    </ConfigurationData>
</Configuration>
```

As described above, in one embodiment, a target interface 16b persists only for a single step within a data transfer. When target interface 16b begins the step, an appropriate method is called, which passes to target interface 16b the appropriate configuration object if any. Where target interface 16b persists only for the current step, this method may be called multiple times (i.e. once for each step of the data transfer). If any configuration is necessary on a per resource basis, it may be desirable to implement a suitable method accordingly. At the conclusion of the step, an appropriate method may be called to release any connection or other resources associated with target interface 16b.

Resource Definition Types

Target types, which may be defined in a <TargetType> element in the data integration server configuration file, may designate a resource definition type, which is a native type used to define resources for target interfaces 16b. For example:

```
<TargetType name="SQLTargetType"
    class="coin.i2.cis.backbus.stdinterfaces.sql.SQLTarget"
    configurationType="SQLTargetConfig"
    resourceDefinitionType="SQLTargetResourceConfig"/>
```

This may be a complete <TargetType> element tag for SQL-TargetType. It refers to the defined resource definition type SQLTargetResourceConfig. The following is an example definition for an instance of the SQLTarget relational target interface 16b and associated resources using this native type:

```
<Target name="SQLTarget" type="SQLTargetType">
    <Resource name="Shipper" dataType="Shipper">
        <DefinitionData>
            <SQLTargetResourceConfig>
                <Sql>import into Shipper values ($company,
                $location)</Sql>
                <DataProperty>
                    <name>company</name>
                    <type>xsd:string</type>
                </DataProperty>
                <DataProperty>
                    <name>location</name>
                    <type>xsd:string</type>
                </DataProperty>
            </SQLTargetResourceConfig>
        </DefinitionData>
    </Resource>
</Target>
```

Session Interfaces

Design Overview

In one embodiment, if one or more programmatic interfaces 16 for a data transfer are defined within a session interface 20, then session interface 20 will be instantiated at the beginning of the data transfer. Any programmatic interface 16 defined within a session interface 20 will have access to configuration information associated with session interface 20 through an appropriate JAVA function call or otherwise. A session interface 20 may be configured to persist only for the life of a single data transfer, such that session interface 20 is released at the conclusion of the data transfer. Alternatively, a session interface 20 may be configured to persist beyond the life of the data transfer, such that session interface 20 is not released until data integration server 10 is shut down.

Session Interface Types

In one embodiment, a session interface 20 represents a single instance of an appropriate JAVA session interface API. As an example, all source interfaces 16a and target interfaces 16b that require access to session interface 20 within its context may be defined as follows.

```
<SessionObject name="MySQLTargetSession"
    type="SQLTargetsessionType"
    configurationType="SQLTargetSessionConfig">
    <Target name="SQLTarget" .../> </SessionObject>
```

To provide session interface 20 with its own configuration information, which is necessary in almost all cases, session interface 20 may be defined with a suitable <SessionObject-Type>. This permits a configurationType attribute to be used. For example:

```
<SessionObjectType name="MySessionType"
    class="com.i2.myProduct.mySessionobject"/>
<SessionObject name="MySession" type="MySessionObjectType">
```

In this case, the session interface type MySessionObjectType implements the JAVA session interface API, which permits multiple session interfaces 20 to refer to the same session object type.

Configuration Types

In one embodiment, session object types defined in a <SessionObjectType> element in the data integration server configuration file may designate a configuration type. This configuration type may be a native type that includes any pertinent configuration information for the session interface 20, such as database connection information. For example:

```
<SessionObjectType name="SQLTargetSessionType"
    class="com.i2.cis.backbus.stdinterfaces.sql.SQLTargetSession"
    configurationType="SQLTargetSessionConfig"/>
```

In this case, the configurationType of SQLTargetSession is SQLTargetSessionConfig, a defined native type. The configuration elements in the data integration server configuration file match this type definition. The following is an example use of the

```
<Configuration name="default">
    <ConfigurationData sessionObject="SQLTargetSession">
        <SQLTargetSessionConfig>
            <userName>user</userName>
            <password>password</password>
            <jdbcType>oracle-thin</jdbcType>
            <connectString>camorc:151:camorc</connectString>
            <logicalToPhysicalMapping>mapping.xml</logicalTo
            PhysicalMapping>
        </SQLTargetSessionConfig>
    </ConfigurationData>
</Configuration>
```

In one embodiment, data integration server 10 may support any number of standard source interfaces 16a, target interfaces 16b, and session interfaces 20 to provide generic data export and import capability. For example only and not by way of limitation, standard programmatic interfaces 16 may be provided for flat files, relational data stores 12, XML files, and any other suitable data stores 12 or data objects. Standard session interfaces 20 may be provided for exporting and importing data from certain data stores 12 or data objects. For example only and not by way of limitation, it may be necessary to use a standard relational session interface 20 in connection with standard relational programmatic interfaces 16.

A standard flat file source interface 16a within data integration server 10 may allow exporting data from a group of flat files. In one embodiment, when defining a data transfer, each flat file exported corresponds to a single resource. A resource definition and native type is defined for each flat file accordingly. Configuration information for a standard flat file source interface 16a may be used to indicate the format, directory location, and extension of each flat file.

A standard flat file target interface 16a within data integration server 10 may allow writing or otherwise importing flat files as the output of data transfers. In one embodiment, when defining a data transfer, each flat file imported corresponds to a single resource. A resource definition and native type is defined for each flat file accordingly. Configuration information for a standard flat file target interface 16b may be used to indicate the format, directory location, and extension for writing or otherwise importing data to flat files.

A standard relational source interface 16a within data integration server 10 may provide a generic way to export data from a relational data store 12. Standard relational source interface 16a may be configured with suitable database connection information and may also include logical-to-physical mapping information for the resources to be exported. In one embodiment, each resource defined for standard relational source interface 16a corresponds to one result set that the underlying data store 12 generates. The resource configuration may include an SQL statement that is necessary to generate the desired result set. Resource configurations may include values to bind when executing the data transfer, referred to as parameters. Using parameters may allow a single resource configuration to support a variety of data transfers.

A standard relational target interface 16b within data integration server 10 may provide a generic way to import or delete data in a relational data store 12. Similar to standard relational source interface 16a, an SQL statement necessary to execute the import or delete operation may be used to configure each resource that is defined for standard relational target interface 16b. Resource configurations may include values to bind when executing the data transfer. Standard relational target interface 16b may be configured to populate these values from source data entities during the data transfer or to define these values as parameters, similar to resources for standard relational source interface 16a. If a certain standard relational target interface 16b is not intended for bulk import operations with respect to certain data stores 12, another standard relational target interface 16b may be implemented to provide a highly optimized solution for such situations.

In one embodiment, a standard relational target interface 16b must always be used in the context of a standard or other relational session interface 20 and must be defined within that session interface 20, which can be configured with appropriate database connection and logical-to-physical mapping information. This is because a data transfer may involve multiple steps, each of which may refer to a different target data store 12, such that connection information must be maintained at the session interface level to persist for the entire data transfer. The connection configuration for a standard relational session interface 20 may be similar to that for standard relational source interface 16a. If a standard relational target interface 16b is highly optimized for bulk import operations with respect to certain data stores 12, a corresponding standard relational session interface 20 may be provided to resolve any dependencies among the steps of data transfers and to load the target data stores 12 in the optimal order.

A standard XML source interface 16a within data integration server 10 may provide a basic interface for exporting certain XML data that is compliant with data integration server requirements. In one embodiment, standard XML source interface 16a operates by exporting each child element of the root element of the source XML file as a data object. Standard XML source interface 16a may not provide the ability to map from arbitrary XML to the native type of the resource or to parse or validate individual exported data objects.

A standard XML target interface 16b within data integration server 10 may provide a basic interface for importing certain XML data that is compliant with data integration server requirements. In one embodiment, standard XML target interface 16b writes one XML file for each resource and operates by inserting each data object as a child element of the root element of the XML file. Like standard XML source interface 16a, standard XML target interface 16b may not provide the ability to parse or validate individual imported data objects.

FIG. 2 illustrates an example method of data integration using a data integration system with programmatic source and target interfaces. The method is described for simplicity as involving a single bulk data transfer in which one or more source interfaces 16a are used and persist only for the life of the data transfer, one or more target interfaces 16b are used and each target interface persists only for a single step of the data transfer, a session interface 28 is provided and persists only for the life of the data transfer, and a transformation interface is provided and persists only for the life of the data transfer.

The method begins at step 100, where an application or other system 14 invokes data integration server 10 requesting a bulk data transfer from one or more source data stores 12a to one or more target data stores 12b. In one embodiment, data integration server instantiates a session interface 20 for the data transfer at step 102, instantiates a transformation interface 28 for the data transfer at step 104, instantiates one or more source interfaces 16a for the one or more source data stores 12a for the data transfer at step 106, and instantiates one or more target interfaces 16b for the one or more target data stores 12b for a first step of the data transfer at step 110. While this order may be preferred in a particular embodiment, interfaces 16a, 16b, 20, and 28 may be instantiated in any appropriate order.

At step 110, data integration server 10 instructs each source interface 16a to extract one or more requested resources from its source data store 12a. In response, at step 112, each source interface 16a extracts a data entity (e.g., a row, object, or other data entity) associated with the one or more requested resources from its source data store 12a. The data entity is passed to transformation interface 28 at step 114 and, at step 116, transformation interface 28 applies its associated transformation logic to transform the extracted data entity. The transformed data entity is then passed to an appropriate target interface 16b at step 118 and target interface 16b loads the data entity into its target data store 12b at step 120. If a next data entity exists for the one or more requested resources at step 122, then the method returns to steps 112-118 for extraction, transformation, and loading of the next data entity.

In one embodiment, steps 112-118 are performed individually for each data entity associated with the one or more requested resources within each source data store 12a, either serially (e.g., data entity by data entity for a first source data store 12a, data entity by data entity for a second source data store 12a, data entity by data entity for a third source data store 12a, and so on), substantially simultaneously (data entity by data entity for each source data store 12a with data entities for a first source data store 12a being processed substantially simultaneously with data entities for a second source data store 12a, a third source data store 12a, and so on), or in any other suitable manner. If the transformation associated with transformation interface 28 cannot be performed on a data entity by data entity basis, then data entity by data entity flow may be accomplished on both sides of the transformation (e.g., data entity by data entity inbound to the transformation, transformation of all data entities, then data entity by data entity outbound from the transformation) to effectively achieve a substantially similar result.

If a next data entity does not exist for the one or more requested resources at step 122, then the method proceeds to step 124, where in this particular embodiment data integration server 10 releases the one or more target interfaces 16b for the first step of the data transfer. If there is a next step of the data transfer at step 126, then data integration server 10 instantiates one or more target interfaces 16b for the one or more target data stores 12b for the next step of the data transfer at step 128 and the method returns to step 110. If there is no next step of the data transfer at step 126, then data integration server 10 releases all source, session, and transformation interfaces 16a, 20, and 28, respectively, for the data transfer at step 130 and the method ends.

Although the present invention has been described with several embodiments, a plethora of changes, substitutions, variations, alterations, and modifications may be suggested to those skilled in the art, and it is intended that the present invention encompass all such changes, substitutions, variations, alterations, and modifications as fall within the spirit and scope of the appended claims.

What is claimed is:

1. A computer-implemented system, comprising:
a data integration server coupled with one or more data stores, the data integration server executing bulk data transfers between the one or more data stores according to an enterprise-level business workflow, the data integration server comprising:
   a plurality of programmatic source interfaces each coupled with one or more source data stores, defined according to a common programmatic source interface specification, and exposed within the data integration server during the bulk data transfer;
   a plurality of programmatic target interfaces, each coupled with one or more target data stores, defined according to a common programmatic target interface specification, and exposed within the data integration server during the bulk data transfer; and
   a plurality of relational interfaces used as alternatives to the plurality of programmatic source interfaces or the plurality of programmatic target interfaces,
   wherein each of the plurality of programmatic source interfaces extracts from the one or more source data stores one or more data entities for loading into any of the one or more target data stores during the bulk data transfer;
   wherein each of the plurality of programmatic target interfaces loads into the one or more target data stores the one or more data entities extracted from the one or more source data stores during the bulk data transfer; and
   wherein the data integration server determines whether to use the plurality of relational interfaces or the plurality of programmatic source interfaces and the plurality of programmatic target interfaces based on file processing time and one or more performance requirements.

2. The system of claim 1, wherein the data integration server exposes bulk data transfer operations as services to applications or other systems within an enterprise-level infrastructure and executes a bulk data transfer operation in response to a request from one or more of the applications or other systems.

3. The system of claim 1, wherein the programmatic source interfaces and the programmatic target interfaces comprise JAVA interfaces.

4. The system of claim 1, wherein:
a programmatic interface is exposed within the data integration server as an industry standard interface supporting the bulk data transfers according to an industry standard protocol; and
the data integration server:
   receives a request from a client indicating that the client is extracting data from or loading data into a data store in accordance with the industry standard protocol;
   creates the programmatic interface to extract the data from or loading of the data into the data store; and
   for data extraction, as the programmatic source interface produces the data extracted from the data store, sends the data to the client in accordance with the industry standard protocol; or
   for data loading, as the data arrives from the client in accordance with the industry standard protocol, sends the data to the programmatic target interface for loading into the data store.

5. The system of claim 4, wherein the data integration server allows a client supporting the industry standard protocol for the bulk data transfers to perform the bulk data transfers with respect to an existing data store using the programmatic interface whether or not the existing data store or an associated existing application supports the bulk data transfers in accordance with the industry standard protocol.

6. The system of claim 1, wherein:
a programmatic source interface is exposed within the data integration server as an industry standard File Transfer Protocol (FTP) interface supporting the bulk data transfers according to an FTP industry standard protocol; and
the data integration server:
   allows an FTP client to open an FTP connection informing the data integration server that the FTP client is downloading a stream of data from the one or more source data stores;
   creates the programmatic source interface to extract the stream of data from the one or more source data stores; and
   as the programmatic source interface produces the stream of data extracted from the one or more source data stores, sends the outgoing stream of data to the FTP client in accordance with the FTP.

7. The system of claim 6, wherein at least one of the FTP clients comprise a commercially available Extract-Transform-Load (ETL) tool supported within the data integration server.

8. The system of claim 1, wherein:
a programmatic target interface is exposed within the data integration server as an industry standard File Transfer Protocol (FTP) interface supporting the bulk data transfers according to an FTP industry standard protocol; and
the data integration server:
   allows an FTP client to open an FTP connection informing the data integration server that the FTP client is uploading a stream of data to the one or more target data stores;
   creates the programmatic target interface to enable loading of the stream of data into the one or more source data stores; and
   as the stream of data arrives from the FTP client in accordance with the FTP, sends the stream of data to the programmatic target interface for loading into the one or more target data stores.

9. The system of claim 8, wherein at least one of the FTP clients comprise a commercially available Extract-Transform-Load (ETL) tool supported within the data integration server.

10. The system of claim 1, wherein a particular data store is a source data store or a target data store for a particular bulk data transfer depending on whether the one or more data entities are extracted from the particular data store or loaded into the particular data store during the particular bulk data transfer.

11. The system of claim 1, wherein loading the one or more data entities comprises inserting, updating, or deleting the one or more data entities.

12. The system of claim 1, wherein:
each of the plurality of programmatic source interfaces and the plurality of programmatic target interfaces comprise one or more resources representing the one or more data entities contained in the one or more data stores are defined; and
the data integration server, in response to a request to execute the bulk data transfer involving one or more resources contained in the one or more data stores, creates each of the programmatic interfaces within which at least one of the resources is defined.

13. The system of claim 1, wherein the data integration server supports a commercially available Extract-Transform-Load (ETL) tool to:
connect directly to the one or more data stores with which the ETL tool is compatible to extract the one or more data entities directly from and load the one or more data entities directly into the one or more data stores; and
connect to the one or more data stores, whether or not the ETL tool is compatible with the one or more data stores, using the programmatic source interfaces and the programmatic target interfaces to extract the one or more data entities from and load the one or more data entities into the one or more data stores.

14. The system of claim 13, wherein the data integration server uses the programmatic source interfaces and the programmatic target interfaces to support compatibility between any of the commercially available ETL tools and any of the one or more data stores.

15. The system of claim 14, wherein the data integration server supports a controller to execute individual bulk data transfers using the programmatic source interfaces and the programmatic target interfaces where either:
the ETL tool is not present; or
the ETL tool is present but capabilities of the ETL tool are not needed to transform the one or more data entities extracted from the one or more source data stores, using one or more of the plurality of programmatic source interfaces, before the extracted data entities are loaded into the one or more target data stores, using one or more of the plurality of programmatic target interfaces.

16. The system of claim 1, further comprising one or more transformation interfaces exposed within the data integration server, each of the one or more transformation interfaces:
comprising one or more of the plurality of programmatic source interfaces and one or more of the plurality of programmatic target interfaces defined within the transformation interface;
comprising custom transformation logic applied to the one or more data entities extracted from one or more source data stores in the bulk data transfer, using one or more of the plurality of programmatic source interfaces, before the extracted data entities are loaded into one or more target data stores in the bulk data transfer, using one or more of the plurality of programmatic target interfaces; and
isolating custom transformation logic from the one or more defined programmatic interfaces; and the data integration server further, in connection with creating the defined programmatic interfaces, creates each of the transformation interfaces within which at least one of the programmatic interfaces is defined for application of the custom transformation logic in the bulk data transfer.

17. The system of claim 16, further comprising a controller supported within the data integration server to use the transformation interface in executing an individual bulk data transfer without using a commercially available Extract-Transform-Load (ETL) tool in connection with the bulk data transfer.

18. A computer-implemented method, comprising:
providing, by a server, a data integration server coupled with one or more data stores, the data integration server executing bulk data transfers between the one or more data stores according to an enterprise-level business workflow;
providing, by the server, a plurality of programmatic source interfaces, each coupled with one or more source data stores, defined according to a common programmatic source interface specification, and exposed within the data integration server during the bulk data transfer;
providing, by the server, a plurality of programmatic target interfaces, each coupled with one or more target data stores, defined according to a common programmatic target interface specification, and exposed within the data integration server during a bulk data transfer;
providing, by the server, a plurality of relational interfaces used as alternatives to the plurality of programmatic source interfaces or the plurality of programmatic target interfaces;
extracting, by the server, from the one or more source data stores one or more data entities for loading into any of the one or more target data stores during the bulk data transfer; and
loading, by the server, into the one or more target data stores the one or more data entities extracted from any of the one or more source data stores during the bulk data transfer,
wherein the data integration server determines whether to use the plurality of relational interfaces or the plurality of programmatic source interfaces and the plurality of programmatic target interfaces based on file processing time and one or more performance requirements.

19. The method of claim 18, wherein the data integration server exposes bulk data transfer operations as services to applications or other systems within an enterprise-level infrastructure and executes a bulk data transfer operation in response to a request from one or more of the applications or other systems.

20. The method of claim 18, wherein the programmatic source interfaces and the programmatic target interfaces comprise JAVA interfaces.

21. The method of claim 18, wherein:
a programmatic interface is exposed within the data integration server as an industry standard interface supporting the bulk data transfers according to an industry standard protocol; and
the method further comprises:
receiving a request from a client indicating that the client is extracting data from or loading data into a data store in accordance with the industry standard protocol;
creating the programmatic interface to extract the data from or loading of the data into the data store; and for data extraction, as the programmatic source interface produces the data extracted from the data store, sending the data to the client in accordance with the industry standard protocol; or for data loading, as the data arrives from the client in accordance with the industry standard protocol, sending the data to the programmatic target interface for loading into the data store.

22. The method of claim 21, further comprising allowing a client supporting the industry standard protocol for the bulk data transfers to perform the bulk data transfers with respect to an existing data store using the programmatic interface whether or not the existing data store or an associated existing application supports the bulk data transfers in accordance with the industry standard protocol.

23. The method of claim 18, wherein:
a programmatic source interface is exposed within the data integration server as an industry standard File Transfer Protocol (FTP) interface supporting the bulk data transfers according to an FTP industry standard protocol; and
the method further comprises:
allowing an FTP client to open an FTP connection informing the data integration server that the FTP client is downloading a stream of data from the one or more source data stores;
creating the programmatic source interface to extract the stream of data from the one or more source data stores; and
as the programmatic source interface produces the stream of data extracted from the one or more source data stores, sending the outgoing stream of data to the FTP client in accordance with the FTP.

24. The method of claim 23, wherein at least one of the FTP clients comprise a commercially available Extract-Transform-Load (ETL) tool supported within the data integration server.

25. The method of claim 18, wherein:
a programmatic target interface is exposed within the data integration server as an industry standard File Transfer Protocol (FTP) interface supporting the bulk data transfers according to an FTP industry standard protocol; and
the method further comprises:
allowing an FTP client to open an FTP connection informing the data integration server that the FTP client is uploading a stream of data to the one or more target data stores;
creating the programmatic target interface to enable loading of the stream of data into the one or more source data stores; and
as the stream of data arrives from the FTP client in accordance with the FTP, sending the stream of data to the programmatic target interface for loading into the one or more target data stores.

26. The method of claim 25, wherein at least one of the FTP clients comprise a commercially available Extract-Transform-Load (ETL) tool supported within the data integration server.

27. The method of claim 18, wherein a particular data store is a source data store or a target data store for a particular bulk data transfer depending on whether the one or more data entities are extracted from the particular data store or loaded into the particular data store during the particular bulk data transfer.

28. The method of claim 18, wherein loading the one or more data entities comprises inserting, updating, or deleting the one or more data entities.

29. The method of claim 18, wherein:
each of the plurality of programmatic source interfaces and the plurality of programmatic target interfaces comprise one or more resources representing the one or more data entities contained in the one or more data stores are defined; and
the method further comprises, in response to a request to execute the bulk data transfer involving one or more resources contained in one or more data stores, creating each of the programmatic interfaces within which at least one of the resources is defined.

30. The method of claim 18, wherein the data integration server supports a commercially available Extract-Transform-Load (ETL) tool to:
connect directly to the one or more data stores with which the ETL tool is compatible to extract the one or more data entities directly from and load the one or more data entities directly into the one or more data stores; and
connect to the one or more data stores, whether or not the ETL tool is compatible with the one or more data stores, using the corresponding programmatic source interfaces and the programmatic target interfaces to extract the one or more data entities from and load the one or more data entities into the one or more data stores.

31. The method of claim 30, further comprising the data integration server using the programmatic source interfaces and the programmatic target interfaces to support compatibility between any of the commercially available ETL tools and any of the one or more data stores.

32. The method of claim 31, further comprising providing a controller within the data integration server to execute individual bulk data transfers using the programmatic source interfaces and the programmatic target interfaces where either:
the ETL Extract Transform Load (ETL) tool is not present; or
the ETL tool is present but capabilities of the ETL tool are not needed to transform the one or more data entities extracted from the one or more source data stores, using one or more of the corresponding plurality of programmatic source interfaces, before the extracted data entities are loaded into the one or more target data stores, using one or more of the corresponding plurality of programmatic target interfaces.

33. The method of claim 18, further comprising:
providing one or more transformation interfaces exposed within the data integration server, each of the one or more transformation interface:
comprising one or more of the plurality of programmatic source interfaces and one or more of the plurality of programmatic target interfaces defined within the transformation interface;
comprising custom transformation logic applied to the one or more data entities extracted from one or more source data stores in the bulk data transfer, using one or more of the corresponding plurality of programmatic source interfaces, before the extracted data entities are loaded into one or more target data stores in the bulk data transfer, using one or more of the corresponding plurality of programmatic target interfaces; and
isolating custom transformation logic from the one or more defined programmatic interfaces; and
the data integration server, in connection with creating the defined programmatic interfaces, creating each of the transformation interfaces within which at least one of the programmatic interfaces is defined for application of the custom transformation logic in the bulk data transfer.

34. The method of claim 33, further comprising providing a controller supported within the data integration server to use the transformation interface in executing an individual bulk data transfer without using a commercially available Extract-Transform-Load (ETL) tool in connection with the bulk data transfer.

35. A non-transitory computer readable medium embodied with software executing bulk data transfers between data stores according to an enterprise-level business workflow, the software when executed using one or more computers is configured to:
provide a data integration server coupled with one or more data stores;
provide a plurality of programmatic source interfaces, each coupled with one or more source data stores, defined according to a common programmatic source interface specification, and exposed within the data integration server during the bulk data transfer;
provide a plurality of programmatic target interfaces, each coupled with one or more target data stores, defined according to a common programmatic target interface specification, and exposed within the data integration server during the bulk data transfer;
provide a plurality of relational interfaces used as alternatives to the plurality of programmatic source interfaces or the plurality of programmatic target interfaces;
extract from the one or more source data stores one or more data entities for loading into any of the one or more target data stores during the bulk data transfer; and
load into the one or more target data stores the one or more data entities extracted from any of the one or more source data stores during the bulk data transfer,
wherein the data integration server determines whether to use the plurality of relational interfaces or the plurality of programmatic source interfaces and the plurality of programmatic target interfaces based on file processing time and one or more performance requirements.

36. The computer readable medium of claim 35, wherein the software is further configured to expose bulk data transfer operations of the data integration server as services to applications or other systems within an enterprise-level infrastructure and to execute a bulk data transfer operation in response to a request from one or more of the application or other system.

37. The computer readable medium of claim 35, wherein the programmatic source interfaces and the programmatic target interfaces comprise JAVA interfaces.

38. The computer readable medium of claim 35, wherein:
a programmatic interface is exposed within the data integration server as an industry standard interface supporting the bulk data transfers according to an industry standard protocol; and
the software is further configured to:
receive a request from a client indicating that the client is extracting data from or loading data into a data store in accordance with the industry standard protocol;
create the corresponding programmatic interface to extract the data from or loading of the data into the data store; and
for data extraction, as the programmatic source interface produces the data extracted from the data store, send the data to the client in accordance with the industry standard protocol; or for data loading, as the data arrives from the client in accordance with the industry standard protocol, send the data to the programmatic target interface for loading into the data store.

39. The computer readable medium of claim 38, wherein the software is further configured to allow a client supporting the industry standard protocol for the bulk data transfers to perform the bulk data transfers with respect to an existing data store using the programmatic interface whether or not the existing data store or an associated existing application supports the bulk data transfers in accordance with the industry standard protocol.

40. The computer readable medium of claim 35, wherein:
a programmatic source interface is exposed within the data integration server as an industry standard File Transfer Protocol (FTP) interface supporting the bulk data transfers according to an FTP industry standard protocol; and
the software is further configured to:
allow an FTP client to open an FTP connection informing the data integration server that the FTP client is downloading a stream of data from the corresponding source data store;
create the programmatic source interface to extract the stream of data from the corresponding source data store; and
as the programmatic source interface produces the stream of data extracted from the corresponding source data store, send the outgoing stream of data to the FTP client in accordance with the FTP.

41. The computer readable medium of claim 40, wherein at least one of the FTP clients comprise a commercially available Extract-Transform-Load (ETL) tool supported within the data integration server.

42. The computer readable medium of claim 35, wherein:
a programmatic target interface is exposed within the data integration server as an industry standard File Transfer Protocol (FTP) interface supporting the bulk data transfers according to an FTP industry standard protocol; and
the software is further configured to:
allow an FTP client to open an FTP connection informing the data integration server that the FTP client is uploading a stream of data to the corresponding target data store;
create the programmatic target interface to enable loading of the stream of data into the corresponding source data store; and
as the stream of data arrives from the FTP client in accordance with the FTP, send the stream of data to the programmatic target interface for loading into the corresponding target data store.

43. The computer readable medium of claim 42, wherein at least one of the FTP clients comprise a commercially available Extract-Transform-Load (ETL) tool supported within the data integration server.

44. The computer readable medium of claim 35, wherein a particular data store is a source data store or a target data store for a particular bulk data transfer depending on whether the one or more data entities are extracted from the particular data store or loaded into the particular data store during the particular bulk data transfer.

45. The computer readable medium of claim 35, wherein loading the one or more data entities comprises inserting, updating, or deleting the one or more data entities.

46. The computer readable medium of claim 35, wherein:
each of the plurality of programmatic source interfaces and the plurality of programmatic target interfaces comprise one or more resources representing the one or more data entities contained in the corresponding data store are defined; and the software is further configured to, in response to a request to execute the bulk data transfer involving one or more resources contained in the one or more data stores, create each of the programmatic interfaces within which at least one of the resources is defined.

47. The computer readable medium of claim 35, wherein the software is further configured to support a commercially available Extract-Transform-Load (ETL) tool configured to:
connect directly to the one or more data stores with which the ETL tool is compatible to extract the one or more data entities directly from and load the one or more data entities directly into the one or more data stores; and
connect to the one or more data stores, whether or not the ETL tool is compatible with the one or more data stores, using the corresponding programmatic source interfaces and the programmatic target interfaces to extract the one or more data entities from and load the one or more data entities into the one or more data stores.

48. The computer readable medium of claim 47, wherein the software is further configured to use the programmatic source interfaces and the programmatic target interfaces to support compatibility between any of the commercially available ETL tools and any of the one or more data stores.

49. The computer readable medium of claim 48, wherein the software is further configured to support a controller configured to execute individual bulk data transfers using the programmatic source interfaces and the programmatic target interfaces where either:
the ETL tool is not present; or
the ETL tool is present but capabilities of the ETL tool are not needed to transform the one or more data entities extracted from the one or more source data stores, using one or more of the corresponding plurality of programmatic source interfaces, before the extracted data entities are loaded into the one or more target data stores, using one or more of the corresponding plurality of programmatic target interfaces.

50. The computer readable medium of claim 35, wherein the software is further configured to:
provide one or more transformation interfaces exposed within the data integration server, each of the one or more transformation interfaces:
comprising one or more of the plurality of programmatic source interfaces and one or more of the plurality of programmatic target interfaces defined within the transformation interface;
comprising custom transformation logic applied to the one or more data entities extracted from one or more source data stores in the bulk data transfer, using one or more of the corresponding plurality of programmatic source interfaces, before the extracted data entities are loaded into one or more target data stores in the bulk data transfer, using one or more of the corresponding plurality of programmatic target interfaces; and
isolating custom transformation logic from the one or more defined programmatic interfaces; and
creating each of the transformation interfaces, in connection with creating the defined programmatic interfaces, within which at least one of the programmatic interfaces is defined for application of the custom transformation logic in the bulk data transfer.

51. The computer readable medium of claim 50, wherein the software is further configured to provide a controller configured to use the transformation interface in executing an individual bulk data transfer without using a commercially available Extract-Transform-Load (ETL) tool in connection with the bulk data transfer.

52. A computer-implemented system for executing bulk data transfers between data stores according to an enterprise-level business workflow, comprising:
a data integration server coupled with one or more data stores, the data integration server exposes bulk data transfer operations as services to applications or other systems within an enterprise-level infrastructure and executes a bulk data transfer operation in response to a request from one or more of the applications or other systems, the data integration server comprising:
a plurality of programmatic source interfaces, each associated with a corresponding source data store, defined according to a common programmatic source interface specification, and exposed within the data integration server during the bulk data transfer according to an enterprise-level business workflow to enable the data integration server to extract from the corresponding source data store one or more data entities for loading into any one or more selected target data stores during the bulk data transfer;
a plurality of programmatic target interfaces, each being associated with a corresponding target data store, defined according to a common programmatic target interface specification, and exposed within the data integration server during the bulk data transfer according to an enterprise-level business workflow to enable the data integration server to load into the corresponding target data store the one or more data entities extracted from any one or more selected source data stores during the bulk data transfer;
a plurality of relational interfaces used as alternatives to the plurality of programmatic source interfaces or the plurality of programmatic target interfaces based on file processing time and one or more performance requirements;
wherein each of the plurality of programmatic source interfaces and the plurality of programmatic target interfaces:
provide to the corresponding source data store and the corresponding target data store an abstraction of bulk data transfer operations within the data integration server such that custom code need not be developed in connection with the corresponding source data store and the corresponding target data store to enable the bulk data transfers between the corresponding source data store and the corresponding target data store; and
isolate from the data integration server specific details associated with the corresponding source data store and the corresponding target data store, wherein custom code need not be developed in connection with the data integration server to enable the bulk data transfers between the corresponding source data store and the corresponding target data store;
one or more transformation interfaces exposed within the data integration server, each of the one or more transformation interfaces:
comprising one or more of the plurality of programmatic source interfaces and one or more of the plurality of programmatic target interfaces defined within the transformation interface;
comprising custom transformation logic applied to the one or more data entities extracted from the one or more source data stores in the bulk data transfer, using one or more of the corresponding plurality of programmatic source interfaces, before the extracted data entities are loaded into the one or more target data stores in the bulk data transfer, using one or more of the corresponding plurality of programmatic target interfaces; and isolating custom transformation logic from the one or more defined programmatic interfaces;

the data integration server further, in connection with creating the defined programmatic interfaces, create each of the transformation interfaces within which at least one of the programmatic interfaces is defined for application of the custom transformation logic in the bulk data transfer; and a controller supported within the data integration server to use the one or more transformation interfaces in executing an individual bulk data transfer without using a commercially available Extract-Transform-Load (ETL) tool in connection with the bulk data transfer, wherein the data integration server determines whether to use the plurality of relational interfaces or the plurality of programmatic source interfaces and the plurality of programmatic target interfaces based on file processing time and one or more performance requirements.

* * * * *

UNITED STATES PATENT AND TRADEMARK OFFICE
CERTIFICATE OF CORRECTION

PATENT NO. : 8,108,534 B2  
APPLICATION NO. : 10/611779  
DATED : January 31, 2012  
INVENTOR(S) : Andrew J. Carroll et al.

It is certified that error appears in the above-identified patent and that said Letters Patent is hereby corrected as shown below:

1. Please amend the paragraph appearing at Column 18, lines 25-42 as indicated below:

In this case, the configuration Type of SQLTargetSession is SQLTargetSessionConfig, a defined native type. The configuration elements in the data integration server configuration file match his type definitions. The following is an example use of the SQLTargetSessionConfig configuration type:

```
<Configuration name="default">
    <ConfigurationData sessionObject= "SQLTargetSession">
        <SQLTargeSessionConfig>
            <useName>use</username>
            <password>password</password>
            <jdbcType>oracle-thin</jdbcType>
            <Connectstring>camorc:151:camorc</connectString>
            <logicalToPhysicalMapping>mapping.xml</logicalTo
            Physicalmapping>
        <SQLTargeSessionConfig>
    </ConfigurationData>
<Configuration>
```

2. Please amend claim 32 appearing at Column 26, lines 32-45 as indicated below

32. The method of claim 31, further, comprising providing a controller within the data integration server to execute individual bulk data transfers using the programmatic source interfaces and the programmatic target interfaces where either:
   the ETL tool is not present; or
   the ETL tool is present but capabilities of the ETL tool are not needed to transform the one or more data entities extracted from the one or more source data stores, using one or more of the corresponding plurality of programmatic target interfaces.

Signed and Sealed this  
Fourteenth Day of May, 2013

Teresa Stanek Rea  
*Acting Director of the United States Patent and Trademark Office*